United States Patent [19]
Grossman

[11] Patent Number: 5,913,245
[45] Date of Patent: Jun. 15, 1999

[54] FLEXIBLE OPTICAL FIBER SENSOR TAPES, SYSTEMS AND METHODS

[76] Inventor: Barry G. Grossman, 530 Sherwood Ave., Satellite Beach, Fla. 32937

[21] Appl. No.: 08/888,664

[22] Filed: Jul. 7, 1997

[51] Int. Cl.⁶ ........................................................ G01L 1/24
[52] U.S. Cl. ........................................ 73/800; 250/227.14
[58] Field of Search ...................... 73/705, 800, 867.624; 250/227.14, 227.1; 385/13; 340/555

[56] References Cited

U.S. PATENT DOCUMENTS

| | | | |
|---|---|---|---|
| 4,560,016 | 12/1985 | Ibanez et al. | 73/800 X |
| 4,609,816 | 9/1986 | Severin | 250/227.14 |
| 4,733,068 | 3/1988 | Thiele et al. | 250/227.14 |
| 4,772,092 | 9/1988 | Hofer et al. | 385/13 |
| 4,830,461 | 5/1989 | Ishiharada et al. | 385/13 |
| 5,056,884 | 10/1991 | Quinlan, Jr. | 385/13 |
| 5,155,493 | 10/1992 | Thursby et al. | 343/700 MS |
| 5,193,129 | 3/1993 | Kramer | 385/13 |
| 5,293,039 | 3/1994 | Mongiols | 350/227.16 |
| 5,357,813 | 10/1994 | Weinberger | 73/800 X |
| 5,502,301 | 3/1996 | Lord | 250/227.14 |
| 5,604,318 | 2/1997 | Fasshauer | 73/862.624 |

FOREIGN PATENT DOCUMENTS

| 62-35235 | 2/1987 | Japan | 73/705 |
|---|---|---|---|

*Primary Examiner*—George Dombroske
*Assistant Examiner*—Paul D. Amrozowicz
*Attorney, Agent, or Firm*—Carroll F. Palmer

[57] ABSTRACT

New types of fiberoptic microbend sensors are in the form of flexible tapes wherein single or multiple layers of mechanically tough flexible tapes form two outside surfaces of the sensors including between them one or more continuous elongated optical fibers, a variety of monofilaments, wires, threads, meshes, ribbons and or like elements to act as deformers to the optical fiber and sufficient adhesive material to form a permanent flexible tape structure. Additional layers of film, optical fibers, and/or deformer elements may be included to augment or modify the intensity of light that issues from the output end of the optical fibers when they are illuminated at their input end while the surface films of the sensor are subjected to pressure, such as when the sensors are used to weight or detect passage of automobiles. Detection or measuring systems and methods using the flexible sensor tapes are disclosed.

4 Claims, 3 Drawing Sheets

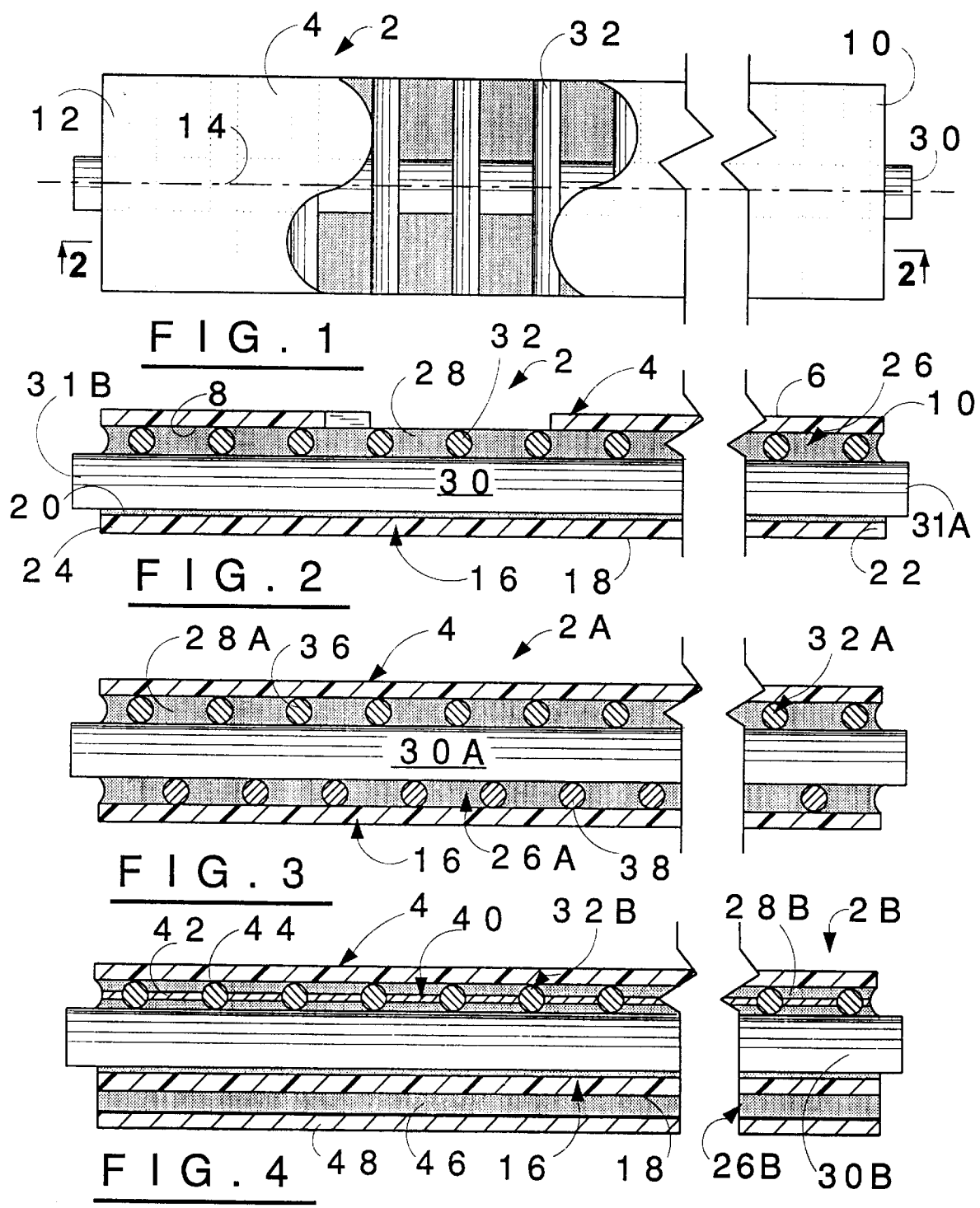

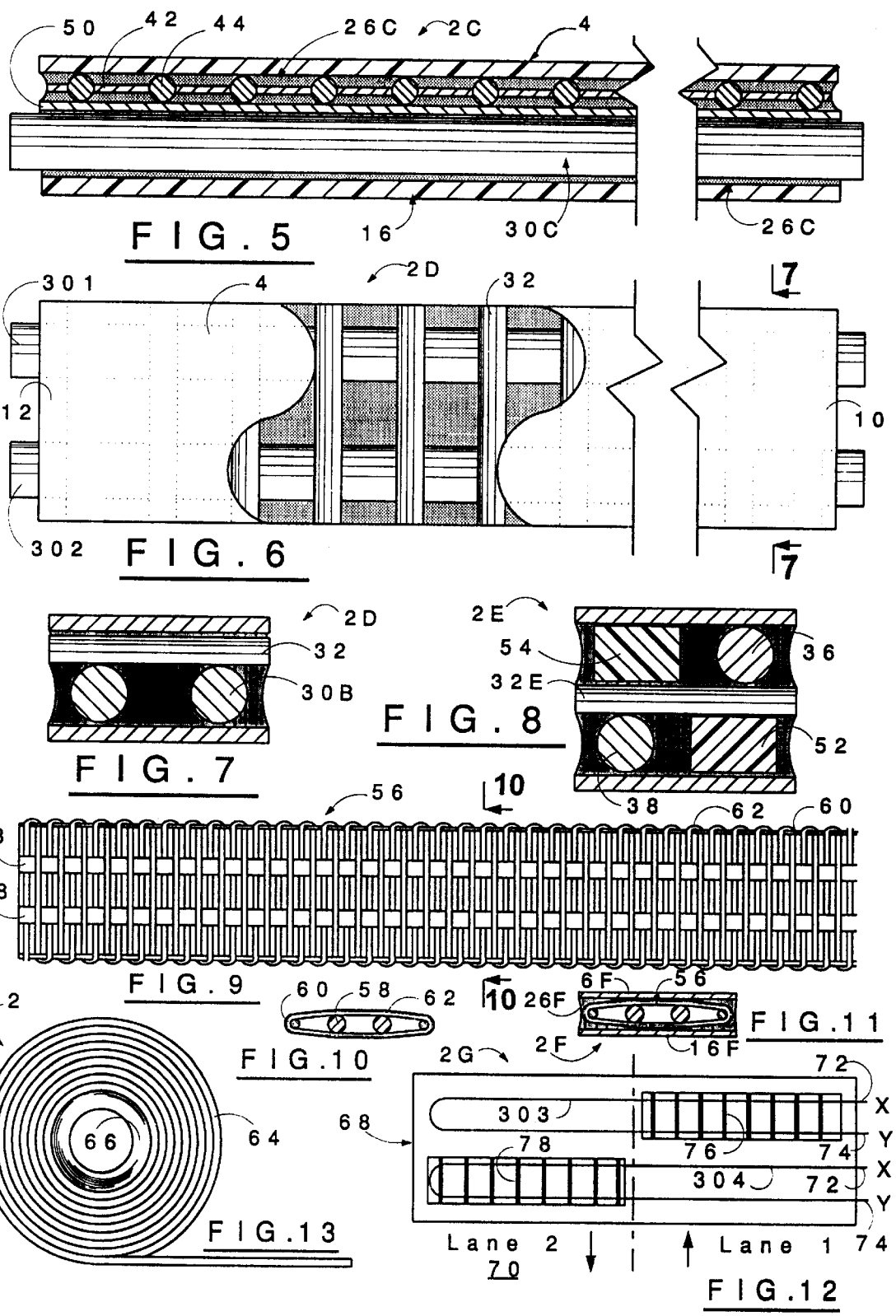

FLEXIBLE OPTICAL FIBER SENSOR TAPES, SYSTEMS AND METHODS

BACKGROUND OF THE INVENTION

1. Field of the Invention

This application relates to optical fiber sensor tapes plus systems and methods comprising such sensor tapes. More particularly, it concerns flexible microbend fiberoptic sensor tapes, methods of making the tapes plus systems and methods for detecting or determining a value, e.g., weight, force, temperature, etc., by use of such flexible tapes.

2. Description of the Prior Art

It is known that a photoelastic effect caused by bending, compression or other deformation of optical fibers can modify their light transmission qualities. Hence, this has resulted in the use of optical fibers as sensing components in methods and devices for measuring a variety of values, e.g., weight, pressure, and temperature, by relating such changes in transmission qualities by via bending, compression or other deformation to a measurement value.

The photoelastic effect sensing ability of optical fibers has been embodied in a variety of measuring devices and methods as shown in various U.S. Pat. Nos. including:

| | |
|---|---|
| 4,560,016 | 5,056,884 |
| 4,618,764 | 5,357,813 |
| 4,718,056 | 5,419,636 |
| 4,812,645 | 5,421,195. |

Conventionally, prior known fiberoptic microbend sensors are fabricated from flat, rigid top and bottom plates; rigid, equally spaced, deformer rods and optical fibers. Typically the optical fiber sensor is positioned within a metal or plastic housing. Due to nature of the materials and the fabrication process, these optical fiber sensors do not lend themselves to low cost mass production, nor afford the possibility of quick and simple conformed mounting on different types of non-planar surfaces. In addition, these prior sensors do not lend themselves to long lengths. Their rigid nature does not allow them to be stored in a compact, rolled up form until use, and then dispensed quickly and as desired. Further, such prior sensors are subject to mechanical failure if sufficient flexing occurs.

The present invention provides the art with further improvements in measuring and detection methods and devices using optical fibers as sensing components that mitigate or eliminate one or more of the deficiencies associated with fiberoptic sensors as related above.

The inventor herein is a copatentee of U.S. Pat. No. 5,155,493 which concerns flexible tape type microstrip patch antenna that may contain optical waveguides. This patent does not teach or suggest to those skilled in the art how to improve upon construction and use of microbend fiberoptic sensors.

OBJECTS

A principal object of the invention is the provision of improvements in devices comprising optical fibers as measuring and detection sensing components.

Another object is the provision of new measuring and detection methods using optical fibers sensing components.

Further objects include the provision of new unique fiberoptic microbend sensors in the form of flexible tapes:

1. That may be utilized in providing improved measurement and/or detection systems.

2. [missing]

3. That can be fabricated in bulk rolls at low cost and easily dispensed.

4. That permit great flexibility in their manufacture.

5. That can be non-uniform in thickness or construction at varying locations along the length of the sensor and can vary in material properties.

6. That enable any sensor of essentially two dimensional shape to be easily fabricated, even into large sizes, e.g., tens or hundreds of square feet in area.

7. That enable multiple sensitivities to be achieved along their length or across their area.

8. That produce minimal feedback to motor vehicle drivers when used to monitor vehicular traffic and are mounted on the road surface because they can be made very thin.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein:

FIG. 1 is a fragmented, partially sectionalized plan view of one embodiment of a flexible microbend fiberoptic sensor tape constructed in accordance with the invention.

FIG. 2 is a lateral sectional view taken on the line a—a of FIG. 1.

FIG. 3 is a fragmented sectional view similar to FIG. 2 of another embodiment of a flexible microbend fiberoptic sensor tape constructed in accordance with the invention.

FIG. 4 is a fragmented sectional view of yet another embodiment of a flexible microbend fiberoptic sensor tape of the invention.

FIG. 5 is a fragmented sectional view of a further embodiment of a flexible microbend fiberoptic sensor tape of the invention.

FIG. 6 is a fragmented, partially sectionalized plan view of a multi-optical fiber containing embodiment of a flexible microbend fiberoptic sensor tape constructed in accordance with the invention.

FIG. 7 is a sectional view taken on the line b—b of FIG. 6.

FIG. 8 is a sectional view similar to FIG. showing another embodiment of sensor tape constructed in accordance with the invention.

FIG. 9 is a plan view of a optical fiber comprising ribbon useable in production of sensor tapes of the invention.

FIG. 10 is a sectional view taken on the line c—c of FIG 9.

FIG. 11 is a sectional view of a sensor tape of the invention comprising ribbon as shown in FIG. 9.

FIG. 12 is a diagram showing a sensor tape constructed in accordance with the invention for multilane recording of two lane motor vehicular traffic traveling on a roadway.

FIG. 13 is a lateral view of a flexible microbend fiberoptic sensor tape of the invention formed into a roll upon a central core.

SUMMARY OF THE INVENTION

Figure 14:
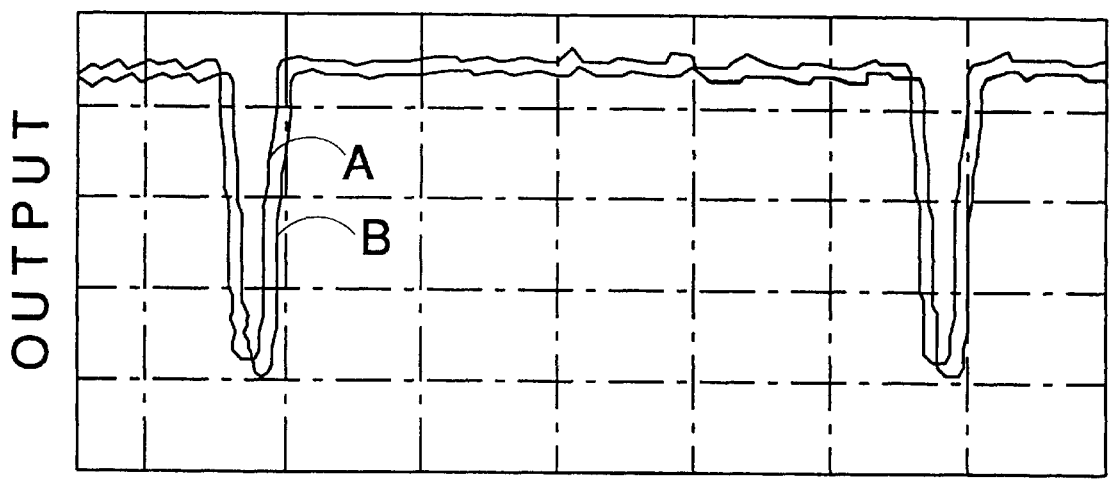
FIG. 14 is a graph of the light transmission value of a double optical fiber flexible microbend fiberoptic sensor tape such as shown in FIG. 6.

The objects are accomplished in accordance with the invention by the provision of new types of fiberoptic microbend sensors basically in the form of flexible tapes wherein single or multiple layers of mechanically tough flexible tapes are used to form two outside surfaces of the sensor.

The invention further provides fabrication techniques which bring together a combination of technologies not previously applied to the fabrication of fiberoptic microbend sensors.

In some preferred embodiments, a variety of meshes, ribbons and other tapes are used to act as deformers to the optical fiber. The tapes and meshes incorporate adhesives to form a permanent structure.

Adhesives may be used to mount the new tape sensors to desired support surfaces and substrates. Also, other tapes may form a protective surface for the sensor by covering the new tape sensors. The resultant sandwich structure forms a highly flexible, low profile, low cost, rugged conformed sensor for measuring weight, pressure, etc.

The new fiberoptic force sensors are (a) easy to install over non-planar surfaces that may be rough in surface texture, (b) can be inexpensively mass produced in a variety of aspect ratios (length-width), particularly in long, narrow lengths, (c) are flexible enough to be rolled up into a compact volume for shipping and storage convenience, (d) can be fabricated in bulk rolls at low cost from which they are easily dispensed and (e) can easily be fabricated in a variety of sensitivities.

The new tape fiberoptic sensors are highly flexible, e.g., a 25 foot long by 3 inches wide sensor of the invention can be rolled into a 4 inch diameter roll. Further, they can be made very thin and thus they can conform to the surface to which they are applied.

Tape and mesh structures used in the construction of the new tape fiberoptic sensors can be non-uniform in thickness at varying locations along the length of the sensor, can vary in material properties, such as modulus, and in the periodicity of the fiberoptic deforming elements, e.g., mesh tapes.

A variety of commercially available structural adhesives may be used to fabricate the new sensors and bond them to a desired substrate. This allows easy removal when required by application of a suitable solvent.

Long lengths in the new sensors may easily be achieved. Lengths are only limited by availability of polymer and metal tapes or meshes and fiber in the proper lengths. Lengths of hundreds of feet can easily be accommodated with readily available materials.

Non-uniform sensitivity can be achieved by changing the material along different length locations. Also, segmented tapes may be made in accordance with the invention to permit sectionalized detections or the like, e.g., two way measure of vehicular traffic.

Any essentially two dimensional shape sensor may easily be fabricated, even large sizes tens or hundreds of square feet in area.

Additional layers of tape may be applied to adjust the sensitivity of the sensor during fabrication or even after installation to account for changes due to the mounting surface.

The ability of the new sensor tapes to be made very thin admits to several advantages. Thus, some embodiments of the new sensor tapes permits irregularities in the substrate to which they are attached in use to act as deforming agents for the optical fiber(s) within thereby eliminating the need for the sensor tape to contain explicit deforming agents. Also, because of their thinness, they produce minimal feedback to drivers when used to monitor vehicular traffic.

The new flexible tape sensors of the invention make a variety of new applications feasible for fiberoptic microbend sensors including:

A. Road sensors for monitoring (counting, classifying, speed and weight and weigh-in-motion) of cars, trucks, bicycles, etc.

B. Weight sensors for car and other vehicle seats to determine if seat is occupied, weight of occupant, etc. for airbag deployment, dead-man switch, etc.

C. Sensors to turn on and off lights, security systems, etc. when a person walks on sensor attached to steps, driveways, or enters restricted areas.

D. Measurement of fuel supply by weight for environments where electrical methods may be hazardous.

E. Intruder detection for border protection, security, homes, etc., by incorporation into or on top of mats, steps, etc.

DESCRIPTION OF THE PREFERRED EMBODIMENTS

With reference in detail to FIGS. 1 & 2 of the drawings, a first embodiment of flexible multi-layer optical fiber sensor tape 2 of the invention comprises a longitudinally elongated thin flexible first outside film 4 defined by a first outside surface 6, a first inside surface 8, a first input end 10, a first output end 12 and a longitudinal axis 14.

The tape further comprises a longitudinally elongated thin flexible second outside film 16 defined by a second outside surface 18, a second inside surface 20, a second input end 22 and a second output end 24.

There are a wide variety of commercially available flexible films suitable for use to provide external surfaces for sensor tapes of the invention, e.g., surfaces 6 & 18 of sensor tape 2. Advantageously, the surface films 4 & 16 will be as thin as possible to meet the intended surface requirements. Light service applications will call for thicknesses of 1–20 mils, while heavy service applications, e.g., highway traffic monitoring, will use heavy guage films of 1–20 mm.

Adhesive means 26 fixes the film 4 relative to the film 16 with surface 8 facing surface 20, input end 10 coterminous with the input end 22 and the output end 12 coterminious with the output end 24 thereby providing an longitudinally elongated internal space 28 defined by the surfaces 8 and 20.

The adhesive means 26 may be selected from a large variety of commercially available liquid cements, thermoplastic adhesives, waxes, or the like.

A continuous elongated optical fiber 30 defined by an input end 31A and output end 31B extends within the internal space 28 between the film input ends 10/22 and output ends 12/24.

A plurality of sensor stress concentrators 32 are positioned longitudinally spaced apart within the internal space 28 and in contact with the optical fiber 30. The stress concentrators 32 specifically illustrated in FIGS. 1–3 are flexible monofilaments of circular cross-section, but they may be of different cross-section, e.g., triangular, oval, square, rectangular, etc., and/or be made of a variety of materials, e.g., plastic monofilaments, braided or spun threads, metal wires, etc. The stress concentrators advantageously have relatively good flexibilty to accomodate the flexibility required in the total sensor tape, but they should also have a modulus of compressibility sufficiently high to inflict a photoelastic effect upon the optical fiber or fibers elements contained in the sensor tapes when pressure or other test value is applied to the optical fiber via the stress concentrators. Suitable values of flexibility, compressbility, etc. can be determined by those skilled in the art by conventional engineering and development procedures.

Referring to FIG. 3, a second embodiment of flexible multi-layer optical fiber sensor tape 2A of the invention comprises a flexible first outside film 4 and a second outside film 16 that define between them an internal space 28A. A continuous elongated optical fiber 30A extends longitudinally and centrally positioned within the internal space 28A. A plurality of monofilaments 36 are positioned normal to the longitudinal axis of tape 2A in contact with both the film 4 and the optical fiber 30A while a plurality of monofilaments 38 are positioned normal to the longitudinal axis of tape 2A in contact with both the film 16 and the optical fiber 30A. The adhesive means 26A which substantially fills the internal space 28A not occupied by the optical fiber 30A, monofilaments 36 and monofilaments 38 serves to bind the these internal components to the surface films 4 & 16 to form the coherent flexible sensor tape 2A. The monofilaments 36 & 38 constitute stress concentrators 32A in the sensor tape 2A and in the staggered arrangement as shown serve to amplify the photoelastic effect created in optical fiber 30A when a compressive force is applied through surface films 4 & 16.

Referring to FIG. 4, a third embodiment of flexible multi-layer optical fiber sensor tape 2B of the invention comprises a flexible first outside film 4 and a second outside film 16 that define between them an internal space 28B. A continuous elongated optical fiber 30B extends longitudinally and off-center positioned within the internal space 28B.

Stress concentrators 32B for sensor tape 23 are in the form of a molded flexible web 40 comprising a central film 42 integral with a plurality of spaced apart, rod-like elements 44 that are positioned normal to the longitudinal axis of tape 2A in contact with both the film 4 and the optical fiber 30B. Adhesive means 26B, which substantially fills the internal space 28B not occupied by the optical fiber 30B and web 40, serves to bind the film 42, elements 44 and optical fiber 30B to the surface films 4 & 16 to form the coherent flexible sensor tape 2B.

The sensor tape 2B, has a layer 46 of pressure-sensitive adhesive applied to external surface 18 of surface film 16. A sheet of release paper 48 protects the PSA layer 46 until the sensor tape 2B is to be applied to a substrate (not shown) when removal of the release paper 48 allows the sensor tape to be adhered to the substrate.

Referring to FIG. 5, a fourth embodiment of sensor tape 2C of the invention is similar to sensor tape 2B, but contains an internal film 50 that mimics area of external films 4 & 16. The adhesive means 26C serves to bind the film 50, film 42, elements 44 and optical fiber 30C to the surface films 4 & 16 to form the coherent flexible sensor tape 2C. The film 50 serves to modulate the optical output characteristics of the optical fiber 30B.

Referring to FIG. 6, the fifth embodiment of sensor tape 2D of the invention is similar to sensor tape 2, but includes a pair of optical fibers 301 & 302. Advantageously, fibers 301 & 302 are of different compositions and possess different optical transmission properties whereby a plurality of different test values may be obtained simultaneously or individually from a single tape with a single installation.

FIG. 7 shows tape 2D in cross section as viewed as shown by line b—b in FIG. 6.

FIG. 8 shows a sixth embodiment of sensor tape 2E of the invention which is a multi-layer type somewhat like that of tape 2A of FIG. 3, but with different arrangement of optical fibers 36 & 38. Thus, sensor tape 2E has centrally located stress concentration means 32E with upper optical fiber 36 offset with respect to lower optical fiber 38. Anvil elastomeric strands 52 & 54 run parallel with optical fibers 36 & 38 opposed across the monofilaments 32E to effectively serve as anvils for fibers 36 & 38 when subjected to compression by the monofilaments 32E. Such multilayer constructions may be used to augment the output values of sensor tapes in accordance with the invention.

With reference to FIGS. 9–11, a section of woven ribbon 56 consists of a pair of longitudinal optical fibers 58, which together with selvage threads 60 constitute the warp of the ribbon while the continuous monofilament 62 is the woof of the ribbon. The ribbon 56 is used as a component of the sensor tape 2F comprising surface films 6F & 16F plus adhesive means 26F. In the sensor tape 2F, the transvere portions of the monofilament 62 act as stress concentrators in accordance with the invention.

As shown in FIG. 13, an important feature of flexible multi-layer optical fiber sensor tapes 2 of the invention is their ability to be spirally wound into the form of a roll 64 upon a supportive core 66. This makes it possible to easily store, transport and handle long lengths of the new sensor tapes.

FIG. 12 diagrammatically illustrates a system 68 in accordance with the invention for detecting the passage of an object, e.g., automobiles (not shown) over a datum surface 70, e.g., roadway consisting of lanes 1 & 2.

The system basically comprises a flexible multi-layer optical fiber sensor tape 2G containing a pair of continuous elongated optical fibers 303 & 304 extending as a loop within the internal space of the sensor tape 2G from their input ends 72 to their output ends 74. A first plurality of stress concentrators 76 are positioned longitudinally and spaced apart within the internal space normally across the optical fiber 303 and a second set of stress concentrators 78 are positioned longitudinally spaced apart within the internal space normally across the optical fiber 304. The flexible multi-layer optical fiber sensor tape 68 is adhesively fixed to the datum surface 70. The system 68 includes means X permitting introduction of light into the optical fibers 303 & 304 at their input ends 72 and means Y for detecting exit of light from their output ends 74.

Figure 16:
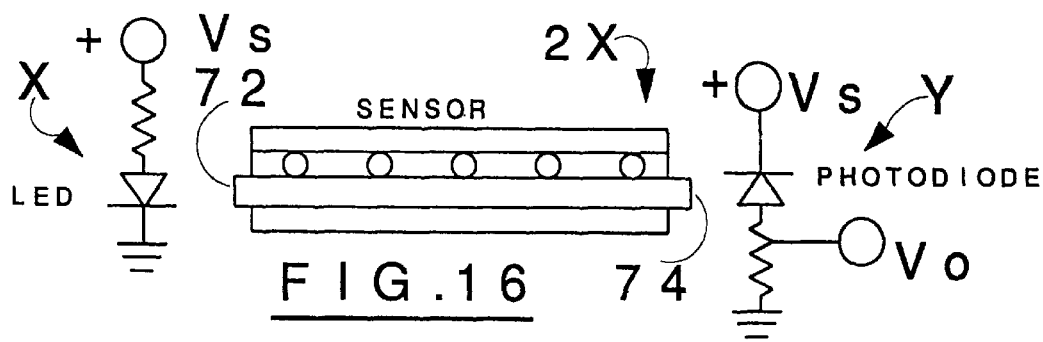
FIG. 16 is a schematic diagram of a system for measuring a value with a flexible microbend fiberoptic sensor tape in accordance with the invention.

FIG. 16 schematially illustrates a light introduction means X (a light emitting diode) illuminating the input end 72 of an optical fiber 303 in a sensor tape 2× plus a light detecting means Y (a photodiode) at the output end 74 of the fiber 303.

FIG. 12 diagrammatically illustrates a method for detecting the passage of an object over a datum surface in accordance with the invention by providing a predetermined length of a flexible multi-layer optical fiber sensor tape 2G, during and after the passage of the object (not shown), e.g., an automobile moving in lane 1 in the direction shown by the arrow, introducing light into the optical fiber 303 at the input end 72, before, during and after the passage of the object, detecting light exiting from the optical fiber 303 at the output end 74, and observing a change in the intensity of the collected light as an indication of the passage of the object.

The system 68 simultaneously and independently enables detection of objects, e.g., automobiles, trucks, etc., in lane 2 in the direction indicated by the arrow. Since there are no stress concentrators 76 across optical fiber 303 in the area of tape 2G covering lane 2, the system 68 will not record via fiber 303 any objects moving in lane 2. Similarly, since there are no stress concentrators 78 across optical fiber 304 in the area of tape 2G covering lane 1, the system 68 will not record via fiber 304 any objects moving in lane 1.

The specific embodiment of a detection system of the invention described above serves to illustrate the great versatility of the new flexible sensor tapes, which in conjunction with the ease with which they can be produced, handled, stored and installed into measurement, detection and like systems, makes them a unique article of manufacture.

FIG. 14 illustrates the time varying analog output signal output vs time from a two optical fiber sensor tape, such as illustrated in FIG. 6, as it is run over by vehicle, e.g., bicycle, automobile, etc., which is typical of the ability of the all described embodiments of sensor tapes of the invention without modification to detect the passage of an object over a surface and simultaneously measure the weight of the passing object. The signal decreases as the load is applied and its amplitude change is a measure of the weight of the passing object. The new tape sensors thus can provide a time varying measurement of the object weight as the object passes over the sensor through know software and/or hardware techniques. Improved accuracy can be obtaining by employing sensor tapes of the invention containing a multiplicity of optical fibers, e.g., as in FIGS. 6 & 9 represented by curves A & B in FIG. 14, since their measured outputs can be averaged to reduce measurement error.

Figure 15:
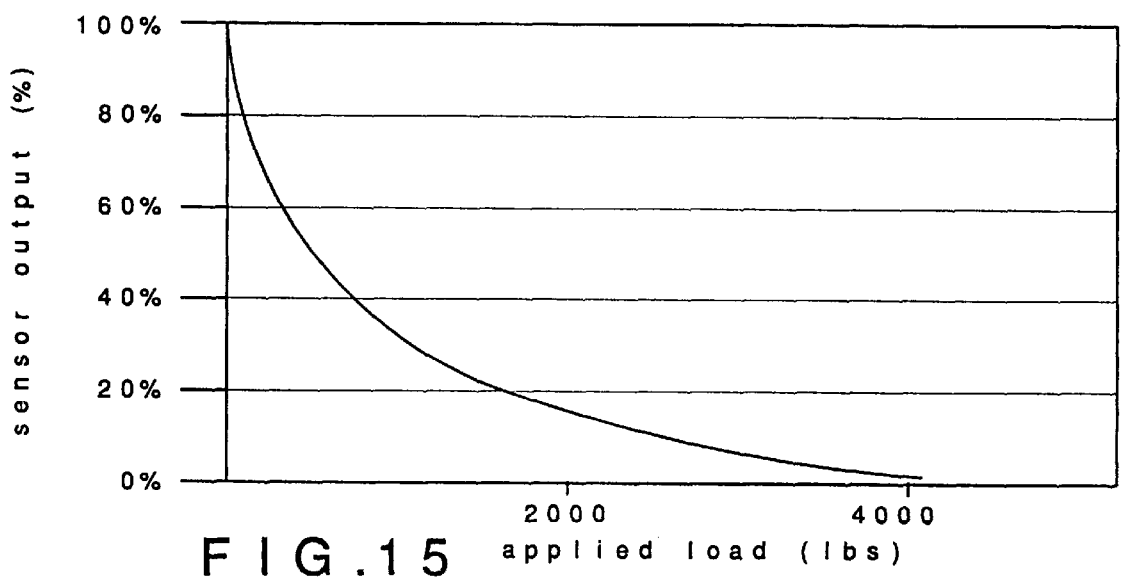
FIG. 15 is a graph of the light output of a flexible microbend fiberoptic sensor vs. load applied to the tape.

FIG. 15 illustrates the loss in signal output from a single optical fiber sensor tape, such as illustrated in FIG. 1, as a static load is applied, e.g., by a hydraulic piston to film 4 while film 6 rests upon a smooth steel plate. The output signal is thus dependent on the load and decreases with increasing load. The sensor signal can be calibrated to output the weight applied through know software and/or hardware techniques.

I claim:

1. A flexible longitudinally elongated multi-layer optical fiber sensor tape in the form of a roll having an initial roll end and a terminal roll end spirally wound upon a supportive core comprising:

a longitudinally elongated thin flexible first outside web defined by a first outside surface, a first inside surface, a first initial end, a first terminal end and a longitudinal axis, a longitudinally elongated thin flexible second outside web defined by a second outside surface, a second inside surface, a second initial end and a second terminal end, adhesive means fixing said first outside web relative to said second outside web with said first inside surface facing said second inside surface, said first initial end coterminous with said second initial end and said first terminal end coterminous with said second terminal end thereby providing an longitudinally elongated internal space defined by said first inside surface and said second inside surface, at least one continuous elongated optical fiber that extends longitudinally within said internal space and is defined by an input fiber end and an output fiber end, and a plurality of sensor stress concentrators positioned longitudinally spaced apart within said internal space and in contact with said optical fiber, said sensor stress concentrators being spaced apart elements that protrude integrally and laterally from a longitudinally elongated thin flexible inside web positioned in said internal space longitudinally aligned with said first and second outside webs.

2. The flexible multi-layer optical fiber sensor tape roll of claim 1 wherein said input fiber end and output fiber end are both positioned at said terminal roll end of said sensor tape and said optical fiber has a loop therein at said initial roll end.

3. A flexible longitudinally elongated multi-layer optical fiber sensor tape in the form of a roll having an initial roll end and a terminal roll end spirally wound upon a supportive core comprising:

a longitudinally elongated thin flexible first outside web defined by a first outside surface, a first inside surface, a first initial end, a first terminal end and a longitudinal axis, a longitudinally elongated thin flexible second outside web defined by a second outside surface, a second inside surface, a second initial end and a second terminal end, adhesive means fixing said first outside web relative to said second outside web with said first inside surface facing said second inside surface, said first initial end coterminous with said second initial end and said first terminal end coterminous with said second terminal end thereby providing an longitudinally elongated internal space defined by said first inside surface and said second inside surface, at least one continuous elongated optical fiber that extends longitudinally within said internal space and is defined by an input fiber end and an output fiber end, a plurality of sensor stress concentrators positioned longitudinally spaced apart within said internal space and in contact with said optical fiber, said sensor stress concentrators being spaced apart elements that protrude integrally and laterally from a longitudinally elongated thin flexible inside web positioned in said internal space longitudinally aligned with said first and second outside webs, and a pressure sensitive adhesive layer covering said second outside surface.

4. The flexible multi-layer optical fiber sensor tape roll of claim 3 wherein a longitudinally elongated release strip overlays said pressure sensitive adhesive layer.

* * * * *